(12) United States Patent
Malaga et al.

(10) Patent No.: US 9,042,502 B2
(45) Date of Patent: *May 26, 2015

(54) WIDEBAND MULTI-CHANNEL RECEIVER WITH FIXED-FREQUENCY NOTCH FILTER FOR INTERFERENCE REJECTION

(71) Applicant: Honeywell International Inc., Morristown, NJ (US)

(72) Inventors: Alfonso Malaga, Sammamish, WA (US); Timothy P. Gibson, Overland Park, KS (US); Jeffrey K. Hunter, Olathe, KS (US); Gregory Triplett, Olathe, KS (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/206,826

(22) Filed: Mar. 12, 2014

(65) Prior Publication Data

US 2014/0177748 A1    Jun. 26, 2014

Related U.S. Application Data

(63) Continuation of application No. 12/965,444, filed on Dec. 10, 2010, now Pat. No. 8,711,993.

(51) Int. Cl.
*H04L 27/00*    (2006.01)
*H04L 25/08*    (2006.01)
(Continued)

(52) U.S. Cl.
CPC .............. *H04L 25/08* (2013.01); *H04B 1/0014* (2013.01); *H04B 1/0017* (2013.01); *H04B 1/0021* (2013.01); *H04B 1/1036* (2013.01)

(58) Field of Classification Search
CPC ........ H04B 1/1036; H04B 1/14; H04B 15/00; H04B 1/0017
USPC .......................................... 375/346, 348, 350
See application file for complete search history.

(56) References Cited

U.S. PATENT DOCUMENTS 3,979,684 A    9/1976 Acker
4,404,685 A    9/1983 Rogers
(Continued)

FOREIGN PATENT DOCUMENTS

EP    1168637    1/2002
EP    1168646    1/2002
(Continued)

OTHER PUBLICATIONS

Pentek, Inc. "Designing a 256-Channel Digital Downconverter". Accessed from http://web.archive.org/web/20100418174334/http://www.pentek.com/tutorials/15_4/digdown.cfm which shows public availability at latest of Apr. 18, 2010. Fig. 1.*

(Continued)

*Primary Examiner* — Shuwang Liu
*Assistant Examiner* — David S Huang
(74) *Attorney, Agent, or Firm* — Fogg & Powers LLC

(57) ABSTRACT

A wideband multi-channel receiver comprises an antenna configured to receive a radio frequency band. A band-pass filter is in signal communication with the antenna, and a low-noise amplifier is in signal communication with the band-pass filter. A mixer is in signal communication with the low-noise amplifier and is configured to translate a radio frequency band to an intermediate frequency (IF) band. A tunable local oscillator is in signal communication with the mixer. At least one fixed-frequency notch filter is in signal communication with the mixer, with the notch filter configured to reject at least one interference signal in the IF band while passing remaining signals in the IF band. An analog-to-digital converter is in signal communication with the notch filter and is configured to convert the remaining signals in the IF band to digital signals.

16 Claims, 2 Drawing Sheets

(51) Int. Cl.
*H04B 1/00* (2006.01)
*H04B 1/10* (2006.01)

(56) References Cited

U.S. PATENT DOCUMENTS

| | | | |
|---|---|---|---|
| 4,982,193 A | 1/1991 | Saul | |
| 5,030,934 A * | 7/1991 | Kinsman | 333/188 |
| 5,280,636 A | 1/1994 | Kelley et al. | |
| 5,317,323 A | 5/1994 | Kennedy et al. | |
| 5,424,674 A | 6/1995 | Skudera, Jr. et al. | |
| 5,467,399 A | 11/1995 | Whitecar | |
| 5,548,839 A | 8/1996 | Caldwell et al. | |
| 5,640,694 A | 6/1997 | Milton, Jr. | |
| 5,659,546 A | 8/1997 | Elder | |
| 5,694,356 A | 12/1997 | Wong et al. | |
| 5,745,846 A | 4/1998 | Myer et al. | |
| 5,771,396 A | 6/1998 | Arnold | |
| 5,822,366 A | 10/1998 | Rapeli | |
| 5,859,878 A | 1/1999 | Phillips et al. | |
| 5,861,831 A | 1/1999 | Murden et al. | |
| 5,870,402 A | 2/1999 | Kelley | |
| 5,898,907 A | 4/1999 | Maruyama | |
| 5,909,193 A | 6/1999 | Phillips et al. | |
| 5,930,310 A | 7/1999 | Freeman | |
| 5,930,682 A | 7/1999 | Schwartz et al. | |
| 5,936,571 A | 8/1999 | Desjardins | |
| 5,956,624 A | 9/1999 | Hunsinger et al. | |
| 6,069,583 A | 5/2000 | Silvestrin et al. | |
| 6,072,994 A | 6/2000 | Phillips et al. | |
| 6,075,808 A | 6/2000 | Tsujimoto | |
| 6,112,141 A | 8/2000 | Briffe et al. | |
| 6,144,331 A | 11/2000 | Jiang | |
| 6,151,354 A | 11/2000 | Abbey | |
| 6,185,248 B1 | 2/2001 | Wiegand | |
| 6,185,434 B1 | 2/2001 | Hagstrom et al. | |
| 6,205,133 B1 | 3/2001 | Bexten | |
| 6,282,184 B1 | 8/2001 | Lehman et al. | |
| 6,307,497 B1 | 10/2001 | Leung et al. | |
| 6,334,051 B1 | 12/2001 | Tsurumi et al. | |
| 6,337,885 B1 | 1/2002 | Hellberg | |
| 6,384,681 B1 | 5/2002 | Bonds | |
| 6,415,001 B1 | 7/2002 | Li et al. | |
| 6,473,596 B1 | 10/2002 | Stamper et al. | |
| 6,477,359 B2 | 11/2002 | Heppe et al. | |
| 6,480,555 B1 | 11/2002 | Renard et al. | |
| 6,496,546 B1 | 12/2002 | Allpress et al. | |
| 6,574,459 B1 | 6/2003 | Kaminski et al. | |
| 6,639,537 B1 | 10/2003 | Raz | |
| 6,678,512 B1 | 1/2004 | Kaminski et al. | |
| 6,898,235 B1 | 5/2005 | Carlin et al. | |
| 6,914,950 B1 | 7/2005 | Luneau | |
| 6,990,327 B2 | 1/2006 | Zheng et al. | |
| 7,116,958 B1 | 10/2006 | Brown et al. | |
| 7,142,818 B2 | 11/2006 | Hunter et al. | |
| 7,200,377 B2 | 4/2007 | Whikehart et al. | |
| 7,535,405 B2 | 5/2009 | Hunter | |
| 7,605,757 B1 | 10/2009 | Gribble et al. | |
| 7,668,505 B2 | 2/2010 | Vacanti et al. | |
| 7,738,610 B2 | 6/2010 | Chan et al. | |
| 8,711,993 B2 * | 4/2014 | Malaga et al. | 375/350 |
| 2002/0118784 A1 | 8/2002 | Teo et al. | |
| 2002/0173341 A1 | 11/2002 | Abdelmonem et al. | |
| 2002/0177446 A1 | 11/2002 | Bugeja et al. | |
| 2002/0193090 A1 | 12/2002 | Sugar et al. | |
| 2003/0072320 A1 | 4/2003 | Seo et al. | |
| 2003/0145328 A1 | 7/2003 | Rabinowitz et al. | |
| 2004/0210932 A1 | 10/2004 | Mori et al. | |
| 2005/0020238 A1 | 1/2005 | Eastman et al. | |
| 2005/0089083 A1 | 4/2005 | Fisher et al. | |
| 2006/0135143 A1 | 6/2006 | Suematsu | |
| 2006/0194611 A1 | 8/2006 | Pasternak | |
| 2006/0227898 A1 | 10/2006 | Gibson et al. | |
| 2006/0252405 A1 | 11/2006 | Matz et al. | |
| 2007/0076813 A1 | 4/2007 | Haartsen | |
| 2007/0129041 A1 | 6/2007 | Yokoyama et al. | |
| 2007/0150631 A1 | 6/2007 | Druke et al. | |
| 2007/0275679 A1 | 11/2007 | Gibson et al. | |
| 2007/0298838 A1 | 12/2007 | Meiyappan et al. | |
| 2008/0095103 A1 * | 4/2008 | Goodjohn | 370/329 |
| 2008/0107093 A1 | 5/2008 | Meiyappan et al. | |
| 2008/0227396 A1 | 9/2008 | Vos | |
| 2009/0023404 A1 | 1/2009 | Leinonen et al. | |
| 2011/0212698 A1 * | 9/2011 | Le Guillou et al. | 455/196.1 |

FOREIGN PATENT DOCUMENTS

| | | |
|---|---|---|
| EP | 1578022 | 9/2005 |
| JP | 9135223 | 5/1997 |
| JP | H10322208 | 12/1998 |
| JP | 2001308730 | 11/2001 |
| WO | 9941851 | 8/1999 |
| WO | 0039936 | 7/2000 |
| WO | 0225304 | 3/2002 |
| WO | 2007039557 | 4/2007 |

OTHER PUBLICATIONS

European Patent Office, European Search Report from EP Application No. 11192261.3 mailed Jun. 20, 2014, from Foreign Counterpart of U.S. Appl. No. 12/965,444, Jun. 20, 2014, pp. 13, Published in: EP.
European Patent Office, Office Action from EP Application No. 11192261.3 mailed Jul. 2, 2014, from Foreign Counterpart of U.S. Appl. No. 12/965,444, Jul. 2, 2014, pp. 17, Published in: EP.
U.S. Patent and Trademark Office, "Notice of Allowance", "U.S. Appl. No. 10/365,807", Jun. 22, 2006, pp. 1-9.
U.S. Patent and Trademark Office, "Office Action", "U.S. Appl. No. 10/365,807", Sep. 19, 2005, pp. 1-13.
U.S. Patent and Trademark Office, "Office Action", "U.S. Appl. No. 10/365,807", Feb. 9, 2006, pp. 1-10.
European Patent Office, "Office Action from EP Application No. 04777764.4 mailed Jan. 21, 2011", "from Foreign Counterpart of U.S. Appl. No. 10/616,796", Jan. 21, 2011, pp. 16, Published in: EP.
International Searching Authority, "International Search Report from PCT Application No. PCT/US2004/021885 mailed Dec. 10, 2004", "from Foreign Counterpart of U.S. Appl. No. 10/616,796", Dec. 10, 2004, pp. 1-3, Published in: WO.
U.S. Patent and Trademark Office, "Advisory Action", "U.S. Appl. No. 10/616,796", Oct. 16, 2007, pp. 1-7.
U.S. Patent and Trademark Office, "Advisory Action", "U.S. Appl. No. 10/616,796", Oct. 10, 2008, pp. 1-4.
U.S. Patent and Trademark Office, "Final Office Action", "U.S. Appl. No. 10/616,796", Aug. 10, 2007, pp. 1-28.
U.S. Patent and Trademark Office, "Final Office Action", "U.S. Appl. No. 10/616,796", Jul. 21, 2008, pp. 1-19.
U.S. Patent and Trademark Office, "Final Office Action", "U.S. Appl. No. 10/616,796", Oct. 13, 2009, pp. 1-28.
U.S. Patent and Trademark Office, "Final Office Action", "U.S. Appl. No. 10/616,796", Oct. 27, 2010.
U.S. Patent and Trademark Office, "Office Action", "U.S. Appl. No. 10/616,796", Nov. 3, 2006, pp. 1-30.
U.S. Patent and Trademark Office, "Office Action", "U.S. Appl. No. 10/616,796", Apr. 20, 2007, pp. 1-20.
U.S. Patent and Trademark Office, "Office Action", "U.S. Appl. No. 10/616,796", Feb. 5, 2008, pp. 1-34.
U.S. Patent and Trademark Office, "Office Action", "U.S. Appl. No. 10/616,796", Nov. 17, 2008, pp. 1-29.
U.S. Patent and Trademark Office, "Office Action", "U.S. Appl. No. 10/616,796", May 12, 2009, pp. 1-25.
U.S. Patent and Trademark Office, "Office Action", "U.S. Appl. No. 10/616,796", Feb. 23, 2010, pp. 1-32.
U.S. Patent and Trademark Office, "Office Action", "U.S. Appl. No. 10/563,397", Oct. 31, 2008, pp. 1-29.
"Analog Devices", "Manufacturer Data Sheer", Mar. 26, 2001, pp. 1-10, Publisher: VersaCOMM Digital Converters.
"Four-Channel, 100 MSPS Digital Receive Signal Processor (RSP)", "AD6624A Data Sheet", 2002, pp. 1-39, Publisher: Analog Devices Inc.

(56) References Cited

OTHER PUBLICATIONS

Brannon et al., "Soft Radio runs into Hard Standards", "EE Times", Mar. 19, 2011, pp. 1-4.

Brannon, "Basics of Designing a Digital Radio Receiver (Radio 101)", "RF Microwave Wireless High Frequency", May 1995, pp. 1-10, Publisher: RF Cafe.

Brannon, "Designing a Super-Heterodyne Multi-Channel Digital Receiver", "Manufacturer Application Note", Jan. 1, 2000, pp. 1-8.

"Series III Avionics Pilot's Guide", 2000, pp. i-43, Publisher: Chelton Avionics Inc.

McCann et al., "DSP Brings Base Station SDR Reality", Sep. 2004, pp. 50-56, Publisher: RF Design Magazine.

Oczak, "Navigation and Communication System", 2000, pp. 1-32.

O'Shea, "What's Up with Down Converters", Nov. 1, 2005, pp. 1-5, Publisher: www.eeproductcenter.com.

"VersaCOMM Digital Converters", "www.analog.com/VersaCOMM", 2000, pp. 1-2, Publisher: Analog Devices.

State Intellectual Property Office, P.R. China, "Office Action from CN Application No. 201110462286.1 mailed Nov. 4, 2014", from Foreign Counterpart of U.S. Appl. No. 14/206,826, Nov. 1, 2014, pp. 1-15, Published in: CN.

\* cited by examiner

WIDEBAND MULTI-CHANNEL RECEIVER WITH FIXED-FREQUENCY NOTCH FILTER FOR INTERFERENCE REJECTION

CROSS-REFERENCE TO RELATED APPLICATION

This application is a continuation of U.S. application Ser. No. 12/965,444, filed on Dec. 10, 2010, the disclosure of which is incorporated herein by reference.

BACKGROUND

In an aviation communication and/or navigation radio receiver, it can be advantageous to demodulate and decode information from more than one channel, all of which are present within a wideband radio frequency (RF) signal received from a single antenna, at the same time. Various architectures and methods for implementing such a system have been previously described and/or developed. In one approach, a continuous radio frequency (RF) band of aviation communication and/or navigation signals are simultaneously converted to the digital domain with a high-speed analog-to-digital converter. A digital processing system can then simultaneously select, process, decode, and output useful information to an aircrew from two or more of the channels present in the RF communications and/or navigation band.

One of the challenges with this architecture is the needed dynamic range for a single wideband receiver to operate in the presence of all the possible signal strengths present in a continuous band. Commercial cellular wireless systems avoid this problem by using one of two techniques: 1) they use separate bands for transmit and receive operation (frequency division duplex operation) and use power control so that the transmitters adjust their power based on how close they are to the receiving base station, thus ensuring that all signals received by the base station are near equal signal strength; or 2) they use time division duplex operation so that all mobile users transmit on time slots assigned for transmit with power control based on how close they are to the base station and receive on time slots assigned for base station transmissions. Thus, commercial wireless cellular base stations may use a single wideband receiver architecture to process digitally the signals received from multiple mobile cell phones and not have to deal with the large differences in the strength of the signals present in the entire receive band or receive time slots.

Perhaps the worst case known to occur is in the aeronautical Very High Frequency (VHF) Communications band of 118-137 MHz, where the same channels/frequencies are used for transmit and receive operation in a half-duplex mode of operation and where coordination between transmitters and receivers is not possible. The dynamic range of the signals present in the VHF communications (COM) band is excessive because an aircraft will have more than one VHF COM transceiver channel active at the same time. When one transceiver transmits (typically on its own antenna), an extremely strong VHF COM signal will be present in the VHF COM frequency band seen by a second VHF COM transceiver (typically on a second antenna). The second VHF COM transceiver is required to receive what may be a very weak signal from a distant ground station, even though the first VHF COM transceiver is driving an extremely strong interfering signal in the band and the frequency separation between the strong and the weak signals may be only a couple of channels.

In a typical single-channel VHF COM transceiver, this condition is addressed with a combination of tunable (or selectable) band-pass filters prior to a mixing stage, followed by a narrow-band single-channel fixed frequency band-pass filter after the mixing stage. The mixing stage is configured to pass the desired channel through the narrow-band fixed frequency band-pass filter rejecting all other signals in the band, prior to processing the desired signal. This architecture, though effective for strong signal rejection, can only receive one channel at a time from among all the channels in the VHF COM band.

One approach to mitigate the effects of a strong interfering signal is the use of tunable RF band-stop (wide notch) filters. These filters can be adjusted by the digital system to reduce the strength of the strong interferer without overly attenuating a weak desired signal. While this approach is somewhat effective, it still does not allow for the full desired performance. Specifically, the selectivity of a tunable RF notch filter implemented with lumped circuit technology is too wide and may attenuate a desired signal too much when the strong interferer is close in frequency. In addition, the transition band of tunable filters is broader than is acceptable to meet the performance expectations of some aircraft operators.

SUMMARY

A wideband multi-channel receiver comprises an antenna configured to receive a radio frequency band comprising an aviation VHF communication band, an aviation VHF navigation band, an aviation L-band, or combinations thereof. A band-pass filter is in signal communication with the antenna, and a low-noise amplifier is in signal communication with the band-pass filter. A mixer is in signal communication with the low-noise amplifier and is configured to translate a radio frequency band to an intermediate frequency band. A tunable local oscillator is in signal communication with the mixer. At least one fixed-frequency notch filter is in signal communication with the mixer, with the fixed-frequency notch filter configured to reject at least one interference signal in the intermediate frequency band while passing remaining signals in the intermediate frequency band. An analog-to-digital converter is in signal communication with the fixed-frequency notch filter and configured to convert the remaining signals in the intermediate frequency band to digital signals. A digital processing system is in signal communication with the analog-to-digital converter.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
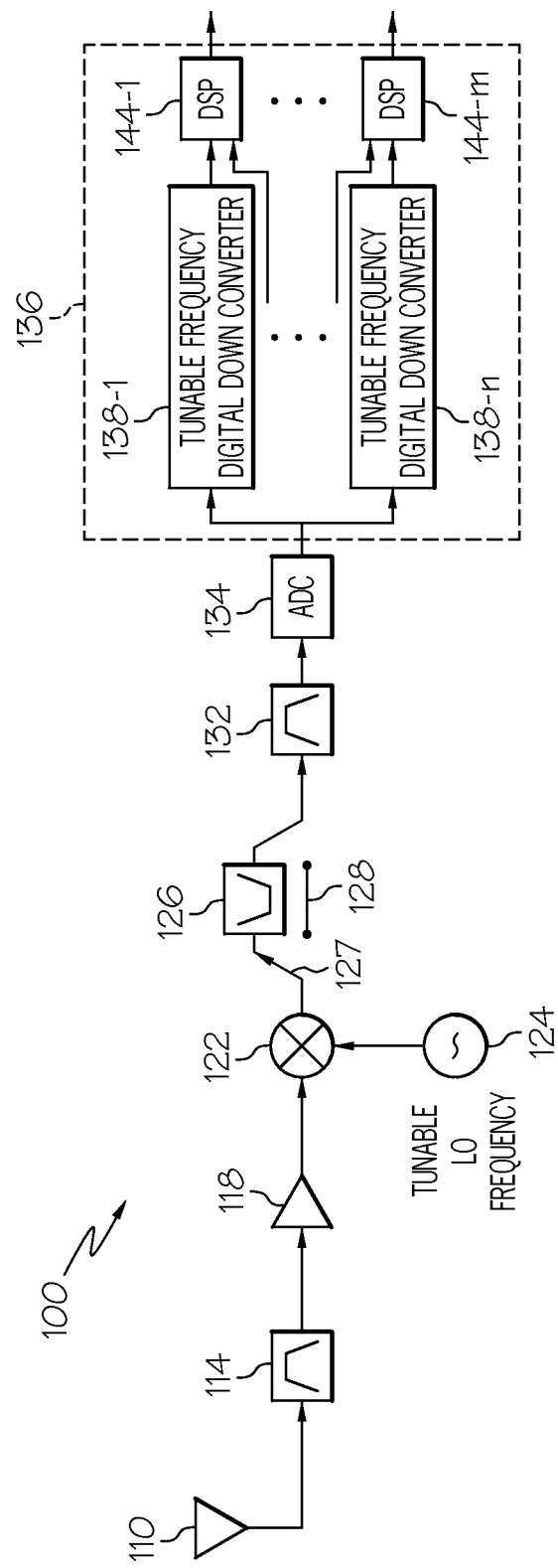
FIG. 1 is a block diagram of a wideband multi-channel receiver according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A wideband multi-channel receiver is provided that utilizes a narrowband fixed-frequency notch filter for interference rejection. The receiver architecture generally includes a mixing stage that translates an entire radio frequency (RF) band of signals to an intermediate frequency (IF) band; a filtering stage after the mixing stage that includes a notch filter, such as a narrow, fixed-frequency, IF band-stop filter; and a digital control stage that controls the frequency of the mixing stage such that a strong interfering signal is aligned with the frequency of rejection of the notch filter.

Using a fixed-frequency, IF band-stop filter has the advantage of a significantly narrower transition band than what can be accomplished with a tunable RF band-stop filter. By using a fixed-frequency, IF band-stop filter better filter technology is available, such as crystal filters. Rather than tuning the notch filter, the local oscillator for the mixing stage is tuned to cause the interfering signal to align with the crystal filter center frequency. In this way, rejection of interfering signals that are near in frequency to desired signals can be accomplished with the same selectivity as a traditional single-channel receiver. Unlike a traditional single-channel receiver the present receiver has the significant benefit that the entire band of signals may be sampled by a high-speed analog-to-digital converter.

Currently available analog-to-digital converters are fast enough to sample an entire band of signals, while allowing enough frequency range to align the channel frequency occupied by a strong interfering signal with the center frequency of a band-stop filter, and providing sufficient range for alias protection. For example, the VHF communications (COM) band is about 20 MHz wide. A crystal band-stop filter can be implemented in the IF stage of the multi-channel receiver at 25 MHz. The VHF COM band can then be mixed such that the entire band is translated to the range of about 5-25 MHz, if the interferer is at one end of the band. Alternatively, if the interferer is at the opposite end of the band, the VHF COM band can be mixed to the range of about 25-45 MHz. There are many analog-to-digital converters that will operate at 100 million samples per second (MSPS), which allows for at least 10 MHz of alias protection on each end of the VHF COM band in the two extreme cases above. It can also be readily seen that faster analog-to-digital converters will have even greater ease of implementation.

In one embodiment, the multi-channel receiver is implemented in a Very High Frequency (VHF) radio capable of receiving two or more VHF channels simultaneously using the same antenna, and switching between transmission on any of the two or more channels. On installations with three VHF radios and dual channel operation per radio, a redundant back-up channel for each of three VHF channels is available. When any one of the three VHF radios fails, the following capabilities are maintained: simultaneous reception on all three channels; transmission on any of the three VHF channels and reception on the other two channels; and simultaneous transmission in two out of three channels, but no reception on the third channel.

The present receiver architecture provides several advantages, including multiple channels (or functions or waveforms) being simultaneously received from a single antenna, and digital processing system that is reconfigurable to select different channels from among all the channels in the RF communications and/or navigation bands or to process different waveforms. The digital processing system can also be updated to handle changing requirements, and operational flexibility and redundancy is improved when using several units with this architecture. In addition, the present receiver overcomes the dynamic range limitations found in conventional broadband aviation communication and/or navigation receivers.

Additional benefits of the present receiver include fault tolerance with no penalty in weight or volume, and improved dispatch reliability. The receiver can be implemented as a single wideband VHF receiver with multiple parallel digital/software demodulators using the same integrated circuits and digital signal processors used to implement a single-channel VHF receiver. The transmitter used in the receiver can be the same as a single-channel transmitter.

Further details with respect to the present wideband multi-channel receiver are described as follows with reference to the drawings.

FIG. 1 illustrates a wideband multi-channel receiver 100 according to one embodiment. The receiver 100 generally includes an antenna 110, a band-pass filter 114, a low-noise amplifier 118, a mixer 122, at least one fixed-frequency notch filter 126, an analog-to-digital converter (ADC) 134, and a digital processing system 136 including at least one tunable frequency digital down converter. Each of these components of receiver 100 is described in further detail as follows.

The antenna 110 is operable to receive a plurality of radio signals transmitted across a frequency band. The antenna 110 can be configured to receive a wide frequency range of radio signals, but for the purpose of this disclosure it is assumed that antenna 110 is configured to receive only a specific range of radio signals in a band where strong co-located transmitters, such as the aeronautical communications band (spanning about 118-137 MHz), or a range of signals in band that is adjacent to bands with strong co-located or nearby transmitters such as the aircraft navigation band (spanning about 108-118 MHz). The antenna 110 may also be configured to receive other bands such as the aeronautical L-band (spanning about 960-1230 MHz) where strong co-located transmitters are also present.

The band select band-pass filter 114 is in signal communication with antenna 110. The band-pass filter 114 is configured to select a desired band of signals from antenna 110, such as aviation signals having a bandwidth from about 108-137 MHz, and reject signals outside of the desired band. For example, band-pass filter 114 can be tuned to pass only the channels within the aeronautical communication band of about 118-137 MHz and/or the aircraft navigation band of about 108-118 MHz.

The low-noise amplifier 118 is in signal communication with band-pass filter 114. The low-noise amplifier 118 is configured to increase the signal strength of the band of signals from band-pass filter 114 and to prevent noise in subsequent stages from contributing materially to signal sensitivity.

The mixer 122 is in signal communication with low-noise amplifier 118. The mixer 122 translates the band of signals from amplifier 118 to an intermediate frequency (IF) band. In one embodiment, a tunable local oscillator 124 is coupled to mixer 122 to feed a local signal at a desired frequency to mixer 122. The mixer 122 and tunable local oscillator 124 can cooperate to select an RF channel with the strongest interference signal and translate the selected RF channel to a fixed intermediate frequency (IF). The frequency of local oscillator 124 can be controlled with digital processing system 136, which is described in further detail hereafter.

In applications such as aeronautical VHF COM systems where an interfering co-located transmitter operates on a channel within the desired receive band, and it is desirable to receive the signal occupying that channel when the co-located transmitter is not active and to "remove", i.e. attenuate, the signal occupying that channel when the co-located transmitter is active, fixed-frequency notch filter 126 is selectively connectable to an output of mixer 122 with a connecting switch 127. In one embodiment, the fixed-frequency notch filter 126 is a narrow, fixed-frequency band-stop crystal filter. A selectable by-pass path 128 can be optionally provided, which is connectable to the output of mixer 122 with switch 127, such that notch filter 126 can be by-passed when the co-located transmitter is not active.

On the other hand, in applications such as aeronautical VHF navigation (NAV) systems where the co-located VHF COM transmitters or nearby strong interfering FM radio transmitters are in adjacent frequency bands, the switch 127 and by-pass path 128 can be omitted. The fixed-frequency notch filter 126 is configured to "remove", i.e. attenuate, an interfering signal at a selected frequency while allowing all of the remaining signals in the IF band to pass un-attenuated. The interfering signal may be a signal within an adjacent band or an interfering transmission from a foreign or non-compliant transmitter. An optional anti-alias filter 132, such as a wide bandwidth anti-alias filter, can be selectively coupled to the output of notch filter 126 or to selectable by-pass path 128. The anti-alias filter 132 can also be directly connected to the output of notch filter 126 if the by-pass path 128 is omitted. The anti-alias filter 132 is configured to pass frequencies that are below the Nyquist bandwidth associated with the ADC sampling rate and reject frequencies above the Nyquist bandwidth.

The ADC 134 is in signal communication with notch filter 126 or optional anti-alias filter 132 and is configured to convert the remaining signals in the IF band to digital signals. In one embodiment, ADC 134 can be a high-speed, high-dynamic-range ADC (14-16 bit) such as those intended for use in software radio applications. The ADC 134 can have a first Nyquist zone of adequate frequency range to simultaneously sample the band of interest, allowing for enough local oscillator tuning range to reject strong interferers within the desired band or in adjacent bands, and still have sufficient range for alias rejection.

The digital processing system 136 includes two or more tunable frequency digital down converters 138-1 to 138-$n$ in signal communication ADC 134. The digital down converters are configured to select, demodulate, decode, and generate digitized baseband signals from multiple signals/channels in the desired band simultaneously. The digitized baseband signals from the various digital down converters are processed by one or more digital signal processor(s) (DSP) 144-1 to 144-$m$, which extract information from the digitized baseband signals. Each DSP may process more than one channel depending on the application and processing throughput capabilities.

The digital processing system 136 controls local oscillator 124 such that a strong interfering signal is translated to the frequency of the notch filters 126. The digital processing system 136 may be configured to perform a Fast Fourier Transform (FFT) on the output signal of ADC 134 to determine the frequency of the strong interfering signal.

Once information has been extracted, the digital signal processors generate output signals that correspond to the information extracted from each processed channel. The output signals may be a plurality of analog and/or digital signals (as required for a particular application) for transmission to a plurality of end user devices or instruments (not shown). For example, in an aviation VHF COM receiver application, audio signals detected from communication signals may be routed in either analog or digital format to the aircraft audio panel and VHF data link (VDL) communications messages/data decoded from digitally modulated signals (e.g., D8PSK), may be routed digitally to a router for distribution to the intended end system. Also, in an aviation VHF NAV receiver application, navigation signals such as instrument landing system (ILS) localizer, and VHF omni-range (VOR), may be routed in either analog or digital formats to mechanical indicators and/or electronic displays, and differential Global Positioning System (GPS) VHF data broadcast (VDB) messages may be routed to a GPS landing system (GLS).

Figure 2:
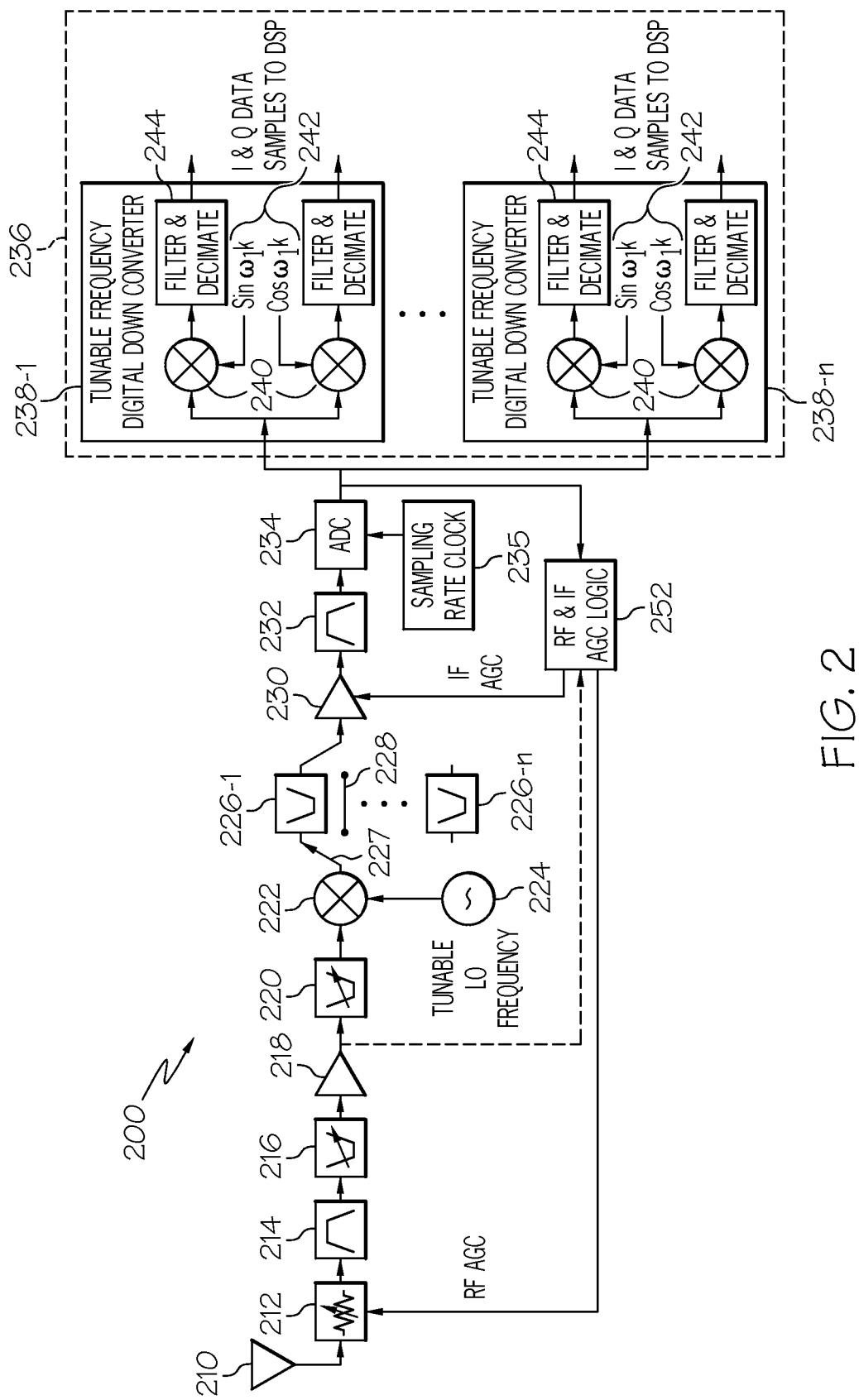
FIG. 2 is a block diagram of a wideband multi-channel receiver according to another embodiment.

FIG. 2 illustrates a wideband multi-channel receiver 200 according to another embodiment. The receiver 200 includes an antenna 210, which is operable to receive a plurality of radio signals transmitted across a frequency band, such as aviation signals having a bandwidth from about 108-137 MHz. Exemplary aviation signals include navigation signals having a bandwidth from about 108-118 MHz, and communication signals having a bandwidth from about 118-137 MHz. Alternatively, the antenna and receiver may be limited to operation within the 108-118 MHz NAV band or the 118-137 MHz COM band.

A variable attenuator 212, which is digitally controlled by automatic gain control logic, is operatively coupled to antenna 210 and is configured to protect against signal overload of receiver 200 due to strong in-band interference or desired signal. The variable attenuator 212 desensitizes receiver 200 in proportion to signal attenuation. Alternatively, variable attenuator 212 may be placed after band-pass filter 214.

A band select band-pass filter 214 is coupled to an output of variable attenuator 212 or directly to antenna 210, and is configured to pass a selected radio frequency band while rejecting signals outside of the selected radio frequency band. For example, band-pass filter 214 can be configured to pass signals within the aviation NAV and COM bands of about 108-137 MHz while rejecting signals outside of the aviation NAV and COM bands. Alternatively, band-pass filter 214 can be configured to pass only the NAV band of about 108-118 MHz or only the COM band of about 118-137 MHz.

A first tunable notch filter 216 is coupled to an output of band-pass filter 214 and is configured to reject in-band interference signals more than 1 MHz away from the selected radio frequency band. The tunable notch filter 216 reduces the attenuation required (less desensitization from attenuator 212) when interference is farther than 1 MHz away from the desired signal.

A low-noise amplifier 218 is coupled to an output of notch filter 216. The amplifier 218 is configured to increase the signal strength of the selected radio frequency band, which prevents noise and signal loss in subsequent stages from contributing materially to signal sensitivity.

A second tunable notch filter 220 is coupled to an output of low-noise amplifier 218. The tunable notch filter 220 provides rejection of additional in-band interference signals more than 1 MHz away from the selected radio frequency band with little degradation in noise figure.

A mixing stage includes a mixer 222 coupled to an output of tunable notch filter 220. A tunable local oscillator 224 is coupled to an input of mixer 222 and feeds a local signal at a desired frequency to mixer 222. The mixer 222 and tunable local oscillator 224 cooperate to select an RF channel with the strongest interference signal, and translate the selected RF channel to an IF band. The frequency of local oscillator 224 can be controlled with a digital processing system 236, which is described in further detail hereafter.

An IF stage is coupled to the output of the mixing stage, and includes a plurality of switchable fixed-frequency notch filters 226-1 to 226-$n$, each of which is selectively connectable to an output of mixer 222 with a connecting switch 227. A selectable path 228 is also connectable to the output of mixer 122 with connecting switch 227, such that the fixed-frequency notch filters can be by-passed as needed. In one embodiment, the fixed-frequency notch filters can be implemented with switched-channel fixed-frequency band-stop crystal filters. The fixed-frequency notch filters are each centered at a different IF band, and configured to reject at least one interference signal while passing the remaining signals in the IF band.

An automatic gain control (AGC) amplifier 230 is selectively connectable to each of the outputs of switchable fixed-frequency notch filters 226-1 to 226-n, or to selectable path 228. The AGC amplifier 230 adjusts the gain of receiver 200 to allow for digitization of all desired signals, such as aviation signals having a bandwidth from about 108-137 MHz. An anti-alias filter 232, such as a wide bandwidth anti-alias filter, is coupled to an output of amplifier 230 and is configured to pass frequencies which are below the Nyquist bandwidth associated with the ADC sampling rate and reject frequencies above the Nyquist bandwidth.

An analog-to-digital converter (ADC) 234 is connected to the output of anti-alias filter 232 and is configured to convert the remaining signals in the IF band to digital signals. The ADC 234 can be a high-speed, high-dynamic-range ADC (14-16 bit) such as used in aviation applications. A sampling rate clock 235 transmits a clock signal to ADC 234. In one embodiment, ADC 234 digitizes the signals in the IF band and mixes the digitized signals with two or more digital IF local oscillators, i.e. digital down-converters, tuned to select two or more channels.

A digital processing system 236 includes a plurality of tunable frequency digital down converters 238-1 to 238-n each of which are coupled to an output of ADC 234. The digital down converters are configured to generate digitized baseband signals from multiple signals/channels simultaneously. Each of the digital down converters include a complex mixing stage 240, a programmable numerically-controlled-oscillator 242 connected to mixing stage 240, and a low-pass filtering and sample-rate decimation stage 244. For example, digital low-pass filters can be used to reject interference in adjacent channels and beyond. A demodulator and/or detector (not shown) is connected to each of the digital down converters and extracts the desired information from the digital signal, such as I (in phase) and Q (quadrature) data samples, which is then transmitted to one or more digital signal processors.

The digital signal processors are configured to simultaneously output information from several channels to one or more end user devices such as on aircraft. For example, the output information can be analog audio signals, digitized audio signals, digital navigation data, digitized data packets such as from a VDL communications system, or signals capable of driving analog navigation displays.

As shown in FIG. 2, receiver 200 can also include an RF and IF AGC logic unit 252, which is coupled to an output of ADC 234. The logic unit 252 is configured to send an IF AGC signal to AGC amplifier 230 to reduce/increase the signal level at the input to the ADC to prevent ADC saturation/increase receiver gain as needed. An RF AGC signal is sent to variable attenuator 212 from logic unit 252 to increase/decrease attenuation to prevent driving the LAN into saturation and minimize receiver desensitization. The logic unit 252 may optionally receive an output signal from low-noise amplifier 218 or notch filter 216 to determine when to increase/decrease RF attenuation.

During operation, digital processing system 236 controls local oscillator 224 such that a strong interfering signal is translated to the frequency of one of notch filters 226-1 to 226-n. The digital processing system 236 may be configured to perform an FFT on the output signal of ADC 234 to determine the frequency of the strong interfering signal. The frequency of the strong interfering signal may also be communicated directly to digital processing system 236 from another source, such as if the strong interfering signal is generated by another COM transceiver on an aircraft. The digital processing system 236 may be informed when the signal from another co-located COM transmitter is active and when it is not by way of a transmit interlock signal from the co-located COM transceiver. The digital processing system 236 may then switch the output of the IF stage from by-pass path 228 to the output of one of notch filters 226-1 to 226-n that is aligned with the channel occupied by the interfering COM transceiver.

It will be understood by those skilled in the art that various modifications can be made to the foregoing embodiments. For example, multiple mixing stages and IF stages can be implemented, with one or more fixed-frequency notch filters employed in one or more of these stages. Alternatively, one IF stage can use a fixed-frequency notch filter and the ADC sampling can be done in a different IF stage. Further, an ADC under-sampling can be performed for a given IF band. Also, different fixed-frequency notch filters can be used in different mixing stages, allowing for the rejection of multiple interferers. Multiple band-stop filters selectable in a single IF stage can also be employed, reducing the required tuning range of the mixing stage.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:
1. A receiver, comprising:
an antenna configured to receive a radio frequency signal comprising an aviation very high frequency (VHF) communication band;
a band-pass filter in signal communication with the antenna and configured to pass a selected radio frequency band while rejecting out-of-band interference signals outside of the selected radio frequency band;
one or more tunable notch filters in signal communication with an output of the band-pass filter and configured to reject one or more in-band interference signals;
a low-noise amplifier in signal communication with an output of the one or more tunable notch filters;
a mixer in signal communication with an output of the low-noise amplifier and configured to translate the selected radio frequency band to an intermediate frequency band;
one or more fixed-frequency notch filters selectively connectable to an output of the mixer, the one or more fixed-frequency notch filters configured to reject at least one narrow frequency band while passing remaining signals in the intermediate frequency band; and
an analog-to-digital converter in signal communication with the one or more fixed-frequency notch filters.
2. The receiver of claim 1, wherein the VHF communication band has a signal range of about 118-137 MHz.

3. The receiver of claim 1, further comprising a tunable local oscillator coupled to an input of the mixer.

4. The receiver of claim 1, wherein the one or more fixed-frequency notch filters comprise fixed-frequency band-stop crystal filters.

5. The receiver of claim 1, further comprising a wide-band anti-alias filter selectively connectable to an output of the one or more fixed-frequency notch filters.

6. The receiver of claim 5, further comprising a selectable path configured to by-pass the one or more fixed-frequency notch filters.

7. The receiver of claim 1, further comprising a digital processing system coupled to an output of the analog-to-digital converter.

8. The receiver of claim 7, wherein the digital processing system comprises:
 at least two tunable frequency digital down converters in signal communication with the analog-to-digital converter; and
 at least one digital signal processor in signal communication with the tunable frequency digital down converters.

9. The receiver of claim 8, wherein the tunable frequency digital down converters each comprise:
 a mixing stage;
 a programmable numerically-controlled-oscillator coupled to the mixing stage; and
 one or more low-pass filtering and sample-rate decimation stages.

10. The receiver of claim 1, wherein the interference signal is from a co-located transmitter operating in the same frequency band as the receiver, or in a frequency band adjacent to the frequency band of the receiver.

11. A wideband multi-channel receiver, comprising:
 an antenna configured to receive a radio frequency signal comprising an aviation L-band;
 at least one band-pass filter in signal communication with the antenna and configured to pass a selected radio frequency band while rejecting out-of-band interference signals outside of the selected radio frequency band;
 a low-noise amplifier in signal communication with the band-pass filter;
 a mixer in signal communication with the low-noise amplifier and configured to translate the selected radio frequency band to an intermediate frequency band;
 one or more fixed-frequency notch filters selectively connectable to an output of the mixer, the one or more fixed-frequency notch filters configured to reject at least one narrow frequency band while passing remaining signals in the intermediate frequency band, wherein one or more selectable paths are configured to by-pass the one or more fixed-frequency notch filters;
 a wide-band anti-alias filter in signal communication with the one or more fixed-frequency notch filters;
 an analog-to-digital converter coupled to an output of the wide-band anti-alias filter; and
 a digital processing system coupled to an output of the analog-to-digital converter, the digital processing system comprising a plurality of tunable frequency digital down converters coupled to the output of the analog-to-digital converter.

12. The receiver of claim 11, wherein the L-band has a signal range of about 960-1230 MHz.

13. The receiver of claim 11, further comprising a variable attenuator responsive to the radio frequency signal and configured to protect against signal overload of the receiver.

14. The receiver of claim 11, further comprising an automatic gain control amplifier selectively connectable to an output of the one or more fixed-frequency notch filters.

15. The receiver of claim 11, further comprising one or more tunable notch filters selectively connectable to an output of the band-pass filter and configured to reject one or more in-band interference signals.

16. The receiver of claim 11, further comprising a tunable local oscillator coupled to an input of the mixer.

* * * * *